United States Patent [19]

Shibata

[11] Patent Number: 4,972,462
[45] Date of Patent: Nov. 20, 1990

[54] MULTIMEDIA MAIL SYSTEM
[75] Inventor: Yoji Shibata, Yokosuka, Japan
[73] Assignee: Hitachi, Ltd., Tokyo, Japan
[21] Appl. No.: 249,714
[22] Filed: Sep. 27, 1988
[30] Foreign Application Priority Data Sep. 29, 1987 [JP] Japan .................................. 62-242438

[51] Int. Cl.⁵ ...................... H04M 3/50; H04M 11/00
[52] U.S. Cl. ........................................ 379/89; 379/94; 379/98
[58] Field of Search ....................... 379/89, 88, 94, 98, 379/100

[56] References Cited

U.S. PATENT DOCUMENTS 4,306,116 12/1981 McClure et al. ........................ 379/28

FOREIGN PATENT DOCUMENTS

| 0131802 | 10/1979 | Japan | 379/100 |
| 0045769 | 3/1982 | Japan | 379/100 |
| 0152072 | 9/1982 | Japan | 379/100 |
| 0138155 | 8/1983 | Japan | 379/100 |
| 60-254862 | 5/1984 | Japan | 379/98 |
| 60-254891 | 5/1984 | Japan | 379/96 |

OTHER PUBLICATIONS

"Japan is Making INS a Reality", M. Kuwabara, *TELEPHONY,* Oct. 24, 1983, pp. 64, 68, 70, 74, 76, 78, 81.
"The Role of the EMS601 in a Modern Office Automation System", R. Kaivers, *Telecom Report* 9 (1986), No. 3, pp. 160-164, (Siemens).
IEICE Technical Report, (Japan), SE 87-1, (Apr. 1987), pp. 1-6.

*Primary Examiner*—Thomas W. Brown
*Attorney, Agent, or Firm*—Kenyon & Kenyon

[57] ABSTRACT

A multimedia mail system utilizes an analog telephone network and interconnects processors at a voice mail center and a text mail center, and provides data/voice transmit/receive mode selectors between the analog telephone network and the paired voice mail center and text mail center and between the analog telephone network and paired voice mail terminal and text mail terminal so that voice and text data can be switched during communication to provide a consolidated voice mail/text mail communication system.

19 Claims, 11 Drawing Sheets

FIG. 3A

1. PERSONAL MAIL
2. GROUP MAIL
3. NOTICE BOARD
4. REAL TIME CHART
5. QUESTIONAIRE
6. MY OPINION

FIG. 3B

1. TRANSMISSION
2. RECEPTION

FIG. 3C

| | Voice/Data | Sender | Subject | Received data |
|---|---|---|---|---|
| | 13. mails are waiting | | | |
| 1 | Data | T. Tanaka | Agreement | 06/14 15:00 |
| 2 | Voice | T. Nakamura | (Urgent) Quotation | 06/14 13:00 |
| 3 | Data | J. Yamada | Meeting Notice | 06/14 11:25 |
| 4 | Data | S. Uemura | Opinion to Mail System | 06/14 8:00 |
| 5 | Voice | H. Gotoh | (Direct from Mail Center) | 06/13 23:15 |
| 6 | Data | K. Kawazu | Business Inquiry | 06/13 22:55 |
| 7 | Voice | N. Katoh | My Opinion | 06/13 22:00 |
| 8 | Data | S. Watanaba | Monthly Report on Inspection | 06/13 21:31 |
| 9 | Voice | T. Yasui | Circuit Diagram | 06/13 18:00 |
| 10 | Data | N. Yukawa | Soft Version | 06/13 14:00 |
| | | | | TO NEXT PAGE |

FIG. 3D

VOICE MESSAGE

FIG. 6
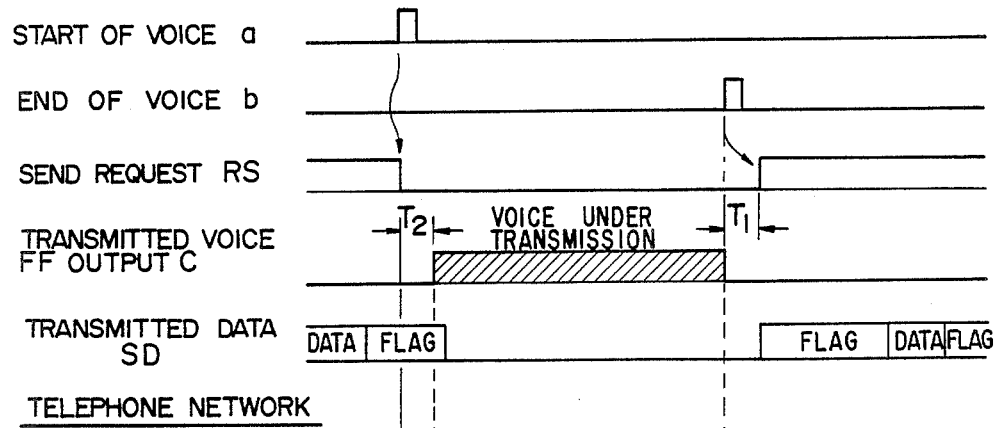
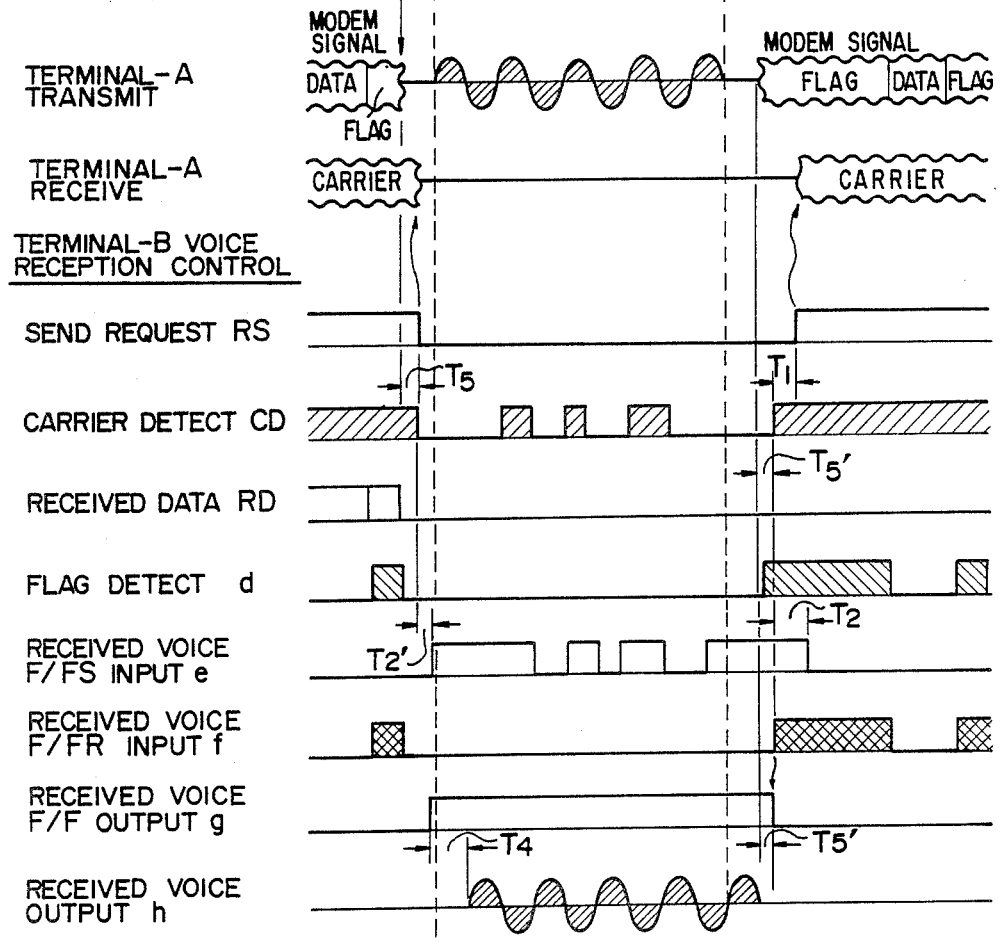

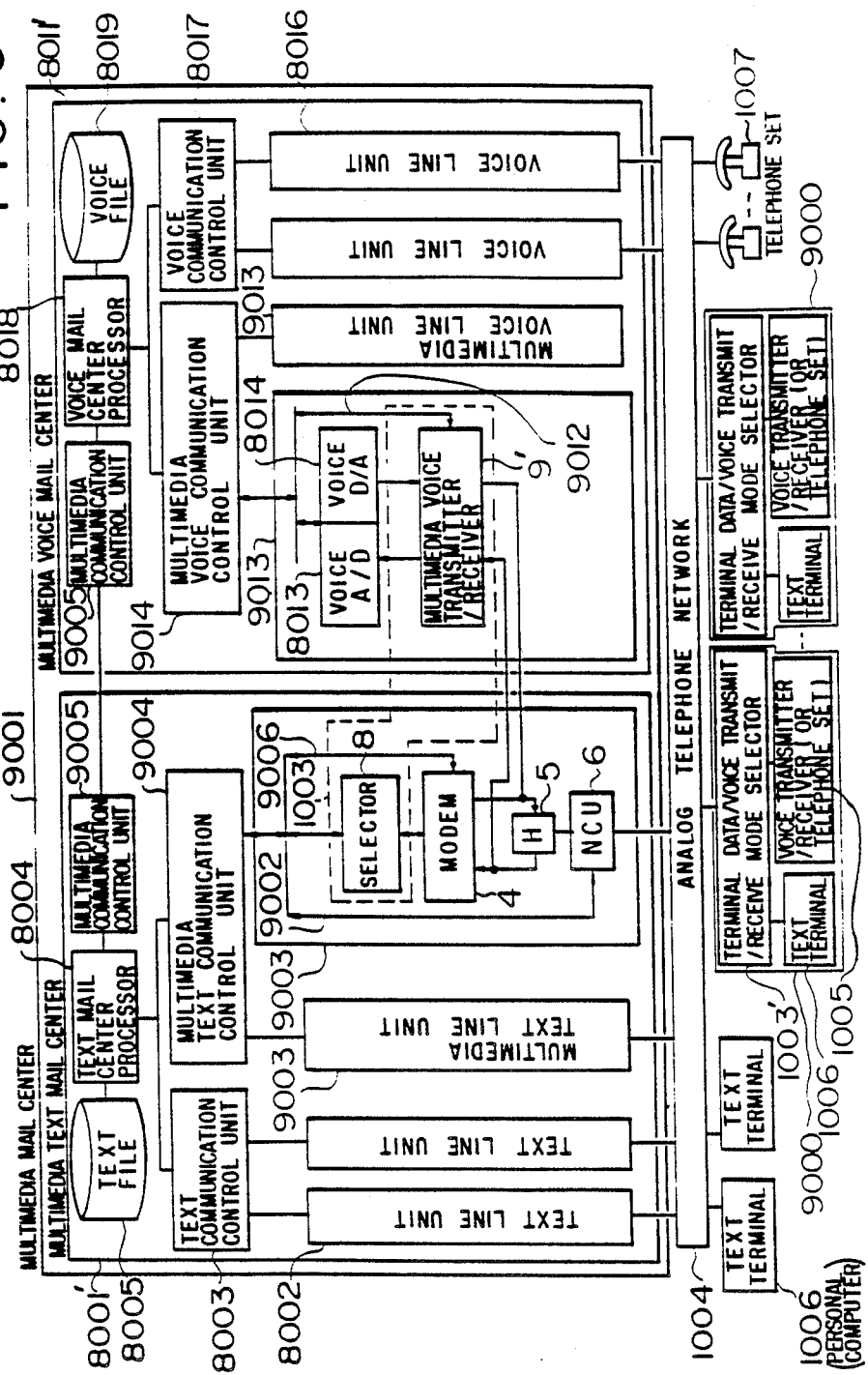

MULTIMEDIA MAIL SYSTEM

BACKGROUND OF THE INVENTION

The present invention relates to a multimedia mail system which utilizes an analog telephone network, and more particularly to a multimedia mail system which consolidates a voice mail and a text mail.

A prior art multimedia mail system which utilizes an analog telephone network is disclosed in an article "One consideration on user management in a multimedia mail system" (IEICE technical report SE87-1 Institute of Electronics and Communication Engineers of (April, 1987)). In this system, a user calls the mail system by dialing a telephone set to send a message (voice, facsimile or text), which is temporarily stored in a mail box provided for each addressee user, and then automatically delivered to an addressee terminal.

However, in the prior art multimedia mail system, the voice data and the text data cannot be switchably sent in one communication. Since means for automatically detecting voice or data communicated through the analog telephone network and automatically sending the data to a data control circuit and the voice to a voice control circuit is not provided in the prior art, it is difficult to structure a consolidated system for voice mail and text mail.

SUMMARY OF THE INVENTION

It is an object of the present invention to provide a multimedia mail system consolidated for voice mail and text mail which has a function to switch the voice data and the text data during communication.

The above object is achieved by intercoupling processors in a voice mail center and a text mail center and providing data/voice transmission/reception mode selectors between line interfaces of those centers and the analog telephone network, and between a paired voice mail terminal and text mail terminal and the analog telephone network.

BRIEF DESCRIPTION OF THE DRAWINGS

FIGS. 3A, 3B, 3C and 3D show search screens when the search guide is conducted and the final message is obtained by voice.

FIG. 6 shows a selection control sequence of the automatic selector of FIG. 4A.

FIG. 9 shows a configuration of a multimedia mail system.

DETAILED DESCRIPTION

A text mail center and voice mail center are physically in one center but are logically or functionally separated. Subscriber data, charge data, and voice mail and text mail control information are communicated between a text mail center processor and a voice mail center processor. When turn off of a modem carrier is detected, a data/voice transmit/receive mode selector provided at a predetermined section of the system selects a voice transmitter/receiver (voice mail center, and microphone and speaker of the terminal). When the modem carrier is detected and a predetermined specific data is also detected, the selector selects a data transmitter/receiver (text mail center and text mail transmitter/receiver).

The present invention is now explained with reference to FIGS. 1-10.

Figure 1:
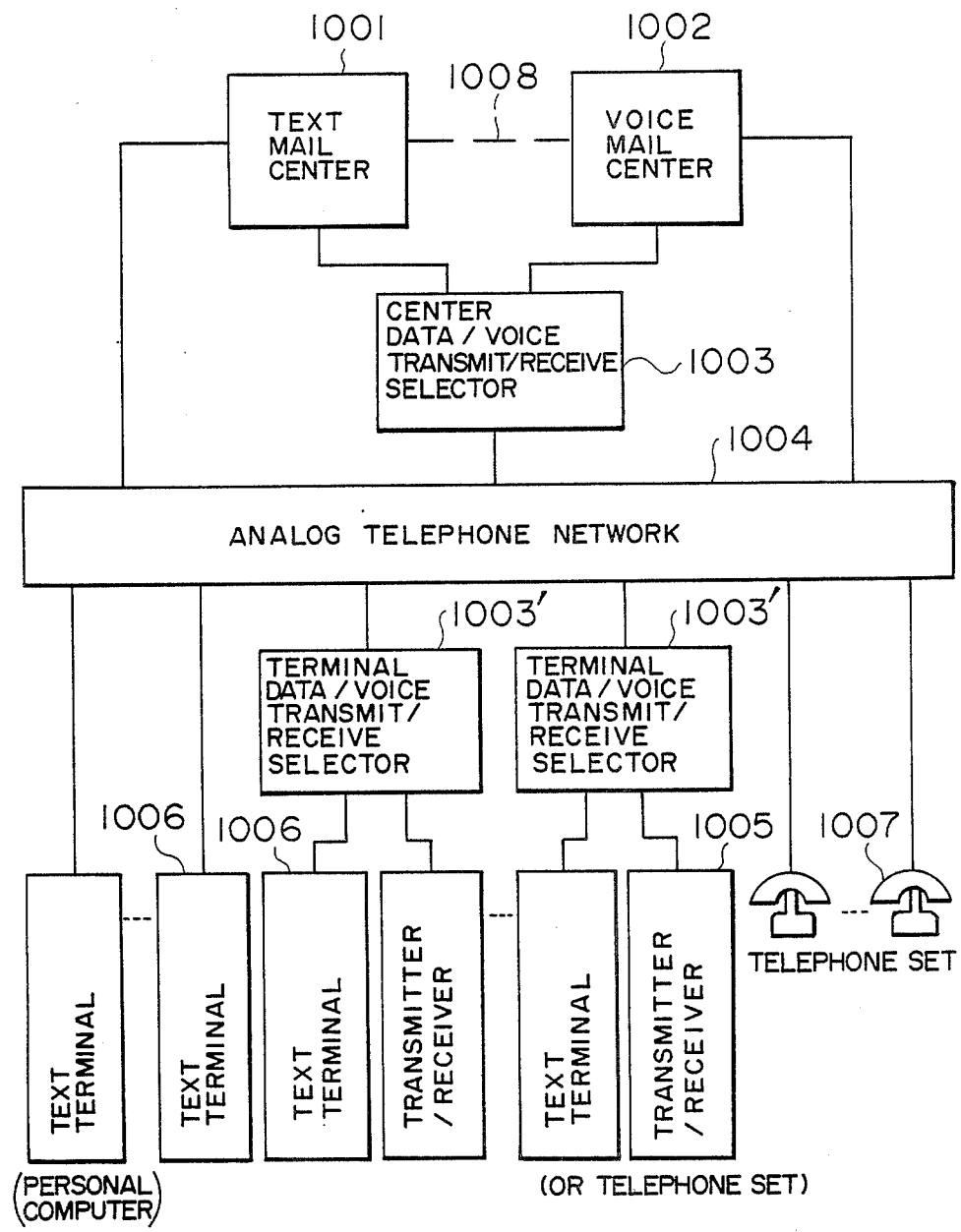
FIG. 1 shows a diagram of a multimedia mail system according to an embodiment of the present invention.

The multimedia mail system of the present invention is first explained. FIG. 1 shows a system configuration. A text mail system comprises a text mail center 1001, an analog telephone network 1004 and a text terminal (typically a personal computer 1006), and a voice mail system comprises a voice mail center 1002, an analog telephone network 1004 and a telephone set 1007. A voice/data consolidated multimedia mail system is constructed by merely adding to the two independent systems a center data/voice transmit/receive mode selector 1003, a terminal data/voice transmit/receive mode selector 1003', an interprocessor communication line 1008, and some programs for controlling the above units. The text terminal 1006 and the telephone set 1007 (or voice transmitter/receiver 1005) need not be modified in their constructions. The processors may be directly connected or coupled through V24 or V28 compatible modem, and communication is done in the CCITT X25 protocol level 2.

In the above system, search guide is conducted by text mails and a final message (for example, mail No. 2) is obtained by voice. This is explained with reference to FIGS. 2 and 3A-3D. When the present system is used as just a text mail system or voice mail system, the operation is the same and the explanation thereof is omitted here.

Figure 2:
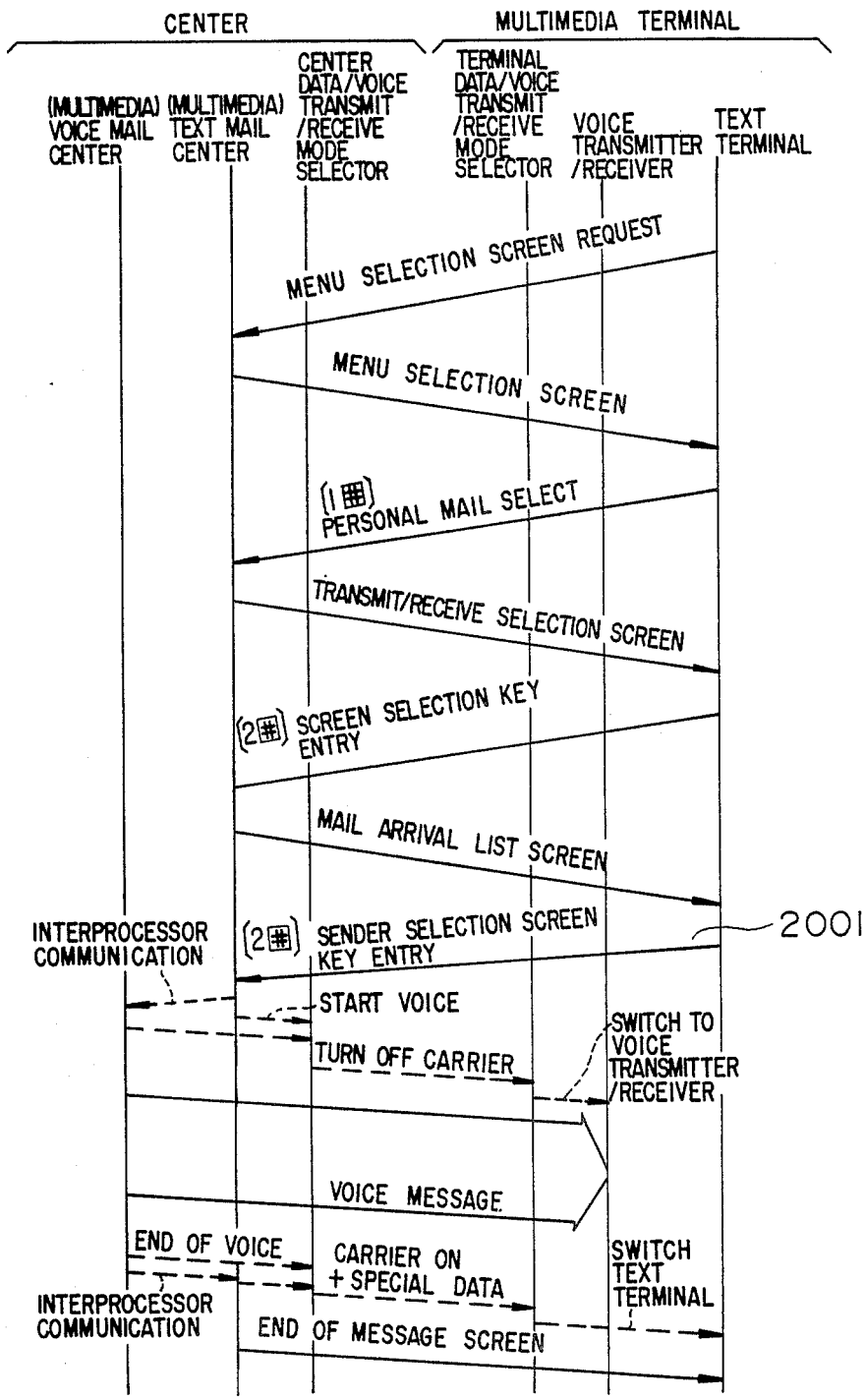
FIG. 2 shows a search sequence when search guide is conducted and a final message is obtained by voice.

The center and terminal data/voice transmit/receive mode selectors 1003 and 1003' select the text mail, and the text terminal 1006 requests a menu select screen. Thereafter, key entries for menu select screen (FIG. 3A), personal mail select, transmit/receive select screen (FIG. 3B), screen select key entry, mail reception list screen (FIG. 3C) and sender select screen are exchanged between the text mail center 1001 and the text terminal 1006 through the data/voice transmit/receive mode selectors 1003 and 1003' so that desired one of 13 mails is selected. Since the final mail is recorded in the form of voice, the text mail center 1001 sends data necessary for message search, charge and message management such as voice message address, to the voice mail center 1002 through the interprocessor communication line 1008 as shown in FIG. 2. Based on the above data, the voice mail center 1002 sets the center data/voice transmit/receive mode selector 1003 to send the voice message. As a result, the modem carrier for transmitting the text in the selector 1003 is turned off. The turn-off of the modem carrier is detected by the terminal data/voice transmit/receive mode selector 1003'. In response to the detection, the communication line is switched to the voice transmitter/receiver (or telephone set) 1005. Thereafter, the voice mail center 1002 sends the voice message to the terminal at an appropriate timing so that it is heard at the terminal (FIG. 3D).

After the voice message has been sent, the voice mail center 1002 informs to the center data/voice transmit/receive mode selector 1003 of the end of voice, and also informs of the end of sending of the voice message to the text mail center 100 by the interprocessor communication. In response thereto, the center data/voice transmit/receive mode selector 1003 turns on the modem carrier for transmitting the text and sends a specific data to the terminal. Those are detected by the terminal data/voice transmit/receive mode selector 1003' so that the communication line is switched to the text terminal. This completes the switching to the text mail communication channel. After the switching, the text mail center 1001 sends an end of message screen to the text terminal 1006 to conduct a series of searches. By keying in the text terminal 1006 while the voice mail center 1002 sends the voice message, the sending of voice may be interrupted and the speech with the text mail center 1001 may be resumed. This function will be described later.

As seen from the above description, the center and terminal data/voice transmit/receive mode selectors are important in the present invention. These are explained with reference to FIGS. 4 to 7.

Figure 4A:
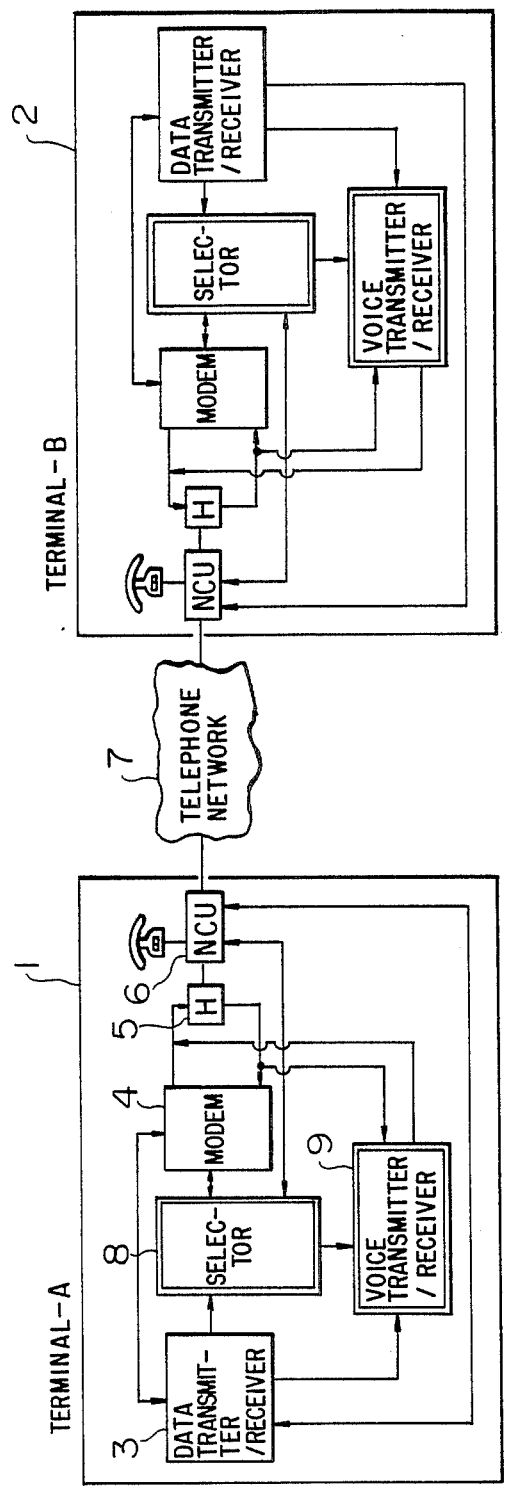
FIG. 4A shows a configuration of a communication system including a data/voice terminal having an automatic selector according to an embodiment of the present invention.
Figure 4B:
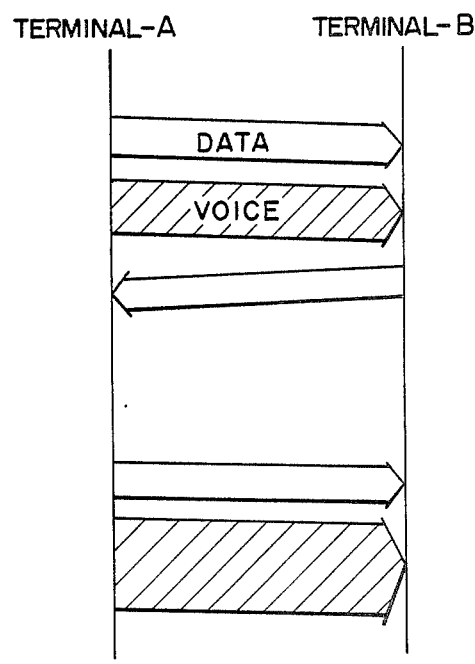
FIG. 4B shows a communication operation of the communication system of FIG. 4A including the data/voice terminal having the automatic selector of the present invention.

FIG. 4A shows a system configuration of the communication system including the data/voice terminals. The terminals 1 and 2 can communicate bilaterally through a telephone network 7. They can communicate natural voice bilaterally. Thus, the terminals 1 and 2 are provided with the voice transmitter/receivers 9, and selectors 8 for controlling the connection of the voice transmitter/receivers 9 to the line. Between the terminals 1 and 2, data and voice are exchanged in a manner shown in FIG. 4B.

Figure 5:
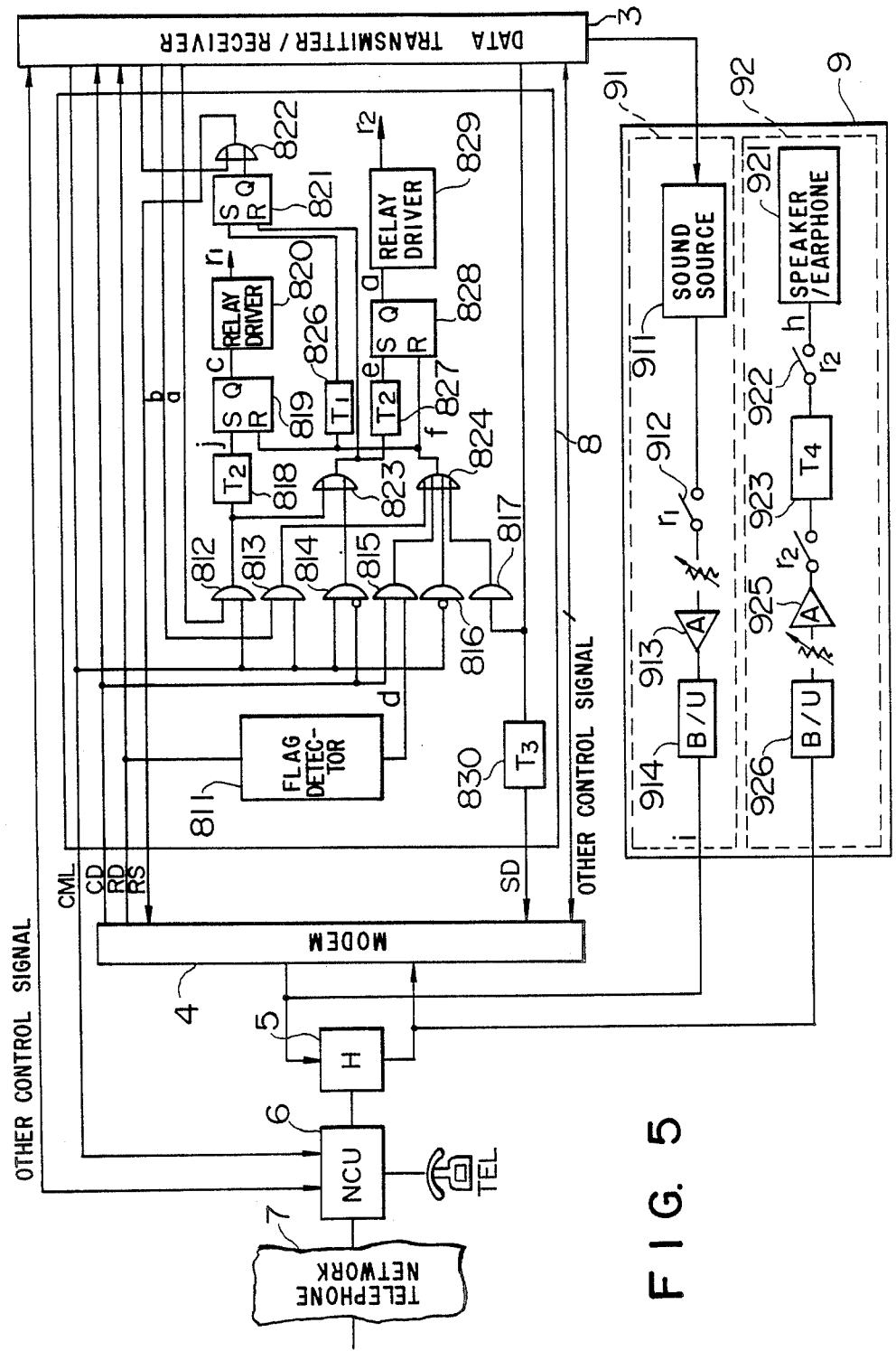
FIG. 5 shows a specific configuration of a terminal of the communication system including the data/voice terminal having the automatic selector according to an embodiment of the present invention.

FIG. 4A and 5 correspond to FIG. 1 in that the terminal 1 corresponds to the mail center, the data transmitter/receiver 3 corresponds to the text mail center 1001, and sound source 911 and speaker/earphone 921 of the voice transmitter/receiver 9 correspond to the voice mail center 1002. The terminal 2 corresponds to the terminal of the present invention, the data transmitter/receiver corresponds to the text terminal 1006, and the sound source 911 and speaker/earphone 921 of the voice transmitter/receiver correspond to the voice transmitter/receiver 1005 (or telephone set). The voice transmit/receive mode selectors 1003 and 1003' of the center terminal of FIG. 1 correspond to the selector 8 and the voice transmitter/receiver 9 of FIG. 4 without the sound source 911 and the speaker/earphone 921.

FIG. 5 shows a specific configuration of the terminals 1 and 2. The selector 8 issues a send request RS to the modem 4 and controls the connection of the voice transmitter/receiver 9 to the line. When an RS flip flop 821 (which is preferentially reset as are for flip-flops 819 and 828 to be described later) is set, or when the data transmitter/receiver 3 issues the send request, the send request RS is sent to the modem 4 through an OR gate 822 and the modem 4 transmits a carrier. When the RS flip-flops 819 and 828 are set, relays R1 and R2 (not shown) are energized by relay drivers 820 and 829, respectively, so that a voice transmitter 91 and a voice receiver 92 are connected to the line through contacts 912 ($r_1$) and 924 ($r_2$).

Before the explanation of the operation, a method for prenoticing beginning of data transmission from a sending terminal is explained. In response to the prenotice, the data transmit/receive mode is set. If the prenotice is made based on only the detection of the modem carrier, there is a risk of error. If a voice signal frequency component coincides with the modem carrier frequency during the reception of voice, and if it continues, it may be misdetected as the prenotice of beginning of data transmission. Accordingly, in the present invention, special data is included in the received data and the prenotice of beginning of data transmission is detected only when such a special data is detected. For example, STX etc. of specific character carrier or its combination in a stepping synchronization system, SYN in a SYN synchronization system, and a flag in a flag synchronization system may be used as special data.

Figure 7:
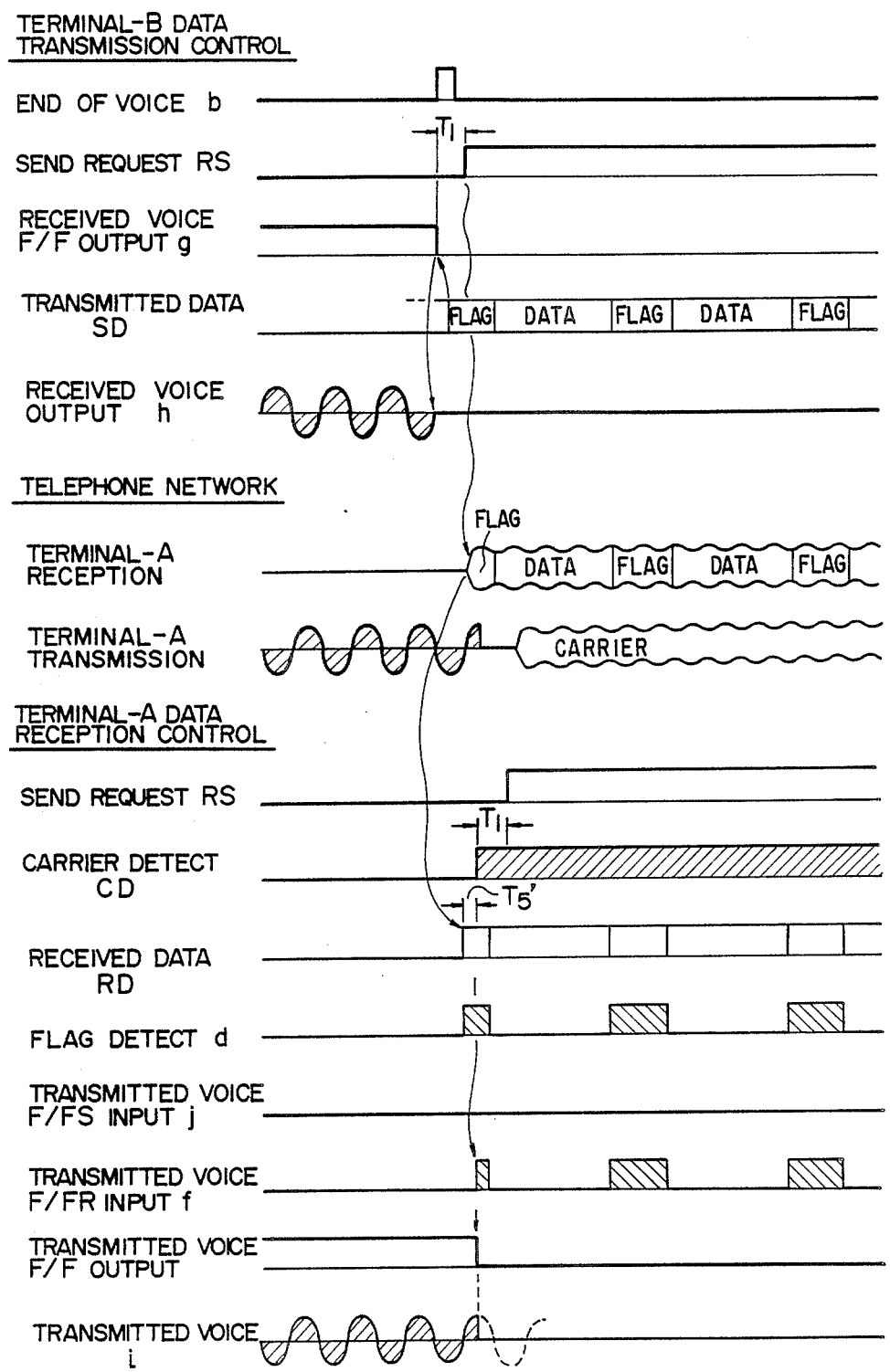
FIG. 7 shows a selection control sequence of the automatic selector FIG. 4A.

Assuming that data is transmitted under the flag synchronization system and the special data for the prenotice of beginning of data transmission is in the form of a flag, the operation is explained with reference to control sequences shown in FIGS. 6 and 7.

When the terminal (A) 1 has completed the data transmission and shifts to the voice transmission, the data transmitter/receiver 3 outputs a voice start signal a when the terminal 1 shifts from the data transmission to the voice transmission. The voice start signal a is ANDed with a line connection command CML by an AND gate 812, and then sets an RS flip-flop 819 through a delay circuit 818 and resets an RS flip-flop 821 through an OR gate 823. In other words, the send request RS in the terminal 1 is immediately stopped by the voice start signal a, and after a time period $T_2$, the voice transmitter 21 comprising sound source 911, relay contact 912, amplifier 913 and balance/unbalance converter 914 is connected to the line so that the voice signal instead of the modem signal is outputted to the line. In this manner, the terminal 1 is set into the voice transmission mode. The voice start signal a from the OR gate 823 also sets the RS flip-flop 828 through the delay circuit 827. As a result, the voice receiver 92 is also connected to the line and the terminal 1 is set into the voice transmit/receive mode.

On the other hand, the terminal (B) 2 always monitors the modem carrier from the terminal 1. When a carrier detect signal CD indicating the turn-off of the carrier is produced, it is detected by the AND gate 814 and the RS flip-flop 821 is reset through the OR gate 823 and the RS flip-flop 828 is set through the delay circuit 827. In other words, when the carrier detect signal CD indicating the turn-off of the carrier is produced, the send request RS is stopped, and after a time period $T_2$ required for being ready to receive the voice, the voice receiver 92 comprising balance/unbalance converter 926, amplifier 925, relay contacts 922 and 924, delay circuit 923 and speaker 921 is connected to the line so that the terminal 2 is set into the voice receive mode. Assuming that $T_5$ is a time period from the turn-off of the carrier from the terminal 1 to the detection of the turn-off, the time relation is set such that $T_2 \geq T_5 + T_2'$. Thus, the terminal 2 can positively receive the received voice from the beginning.

When the transmission of voice from the terminal 1 is terminated, the terminal 1 outputs an end of voice signal b from the data transmitter/receiver 3. The signal b resets the. RS flip-flops 819 and 828 through the AND gate 813 and the OR gate 824, and it is delayed for a time $T_1$ by the delay circuit 826 to set the RS flip-flop 821. The terminal 1 is set into the data transmit/receive mode. When the RS flip-flop 821 is set, the send request RS is issued and the transmission of the modem carrier is started. The terminal 1 first sends a flag as the send data SD. If there is no send data SD, the sending of the flag may be omitted.

On the other hand, the terminal 2 detects the carrier sent from the terminal 1. When the flag included in the carrier is detected by the flag detection circuit 811, the RS flip-flops 819 and 822 are reset by the output of the AND gate 815 through the OR gate 824, and after the time period $T_1$, the RS flip-flop 821 is set. It is detected as the previous notice of beginning of the data transmission and the mode is switched from the voice receive mode to the data transmit/receive mode. In this case, if any countermeasurement is done, the modem carrier sound is reproduced by the speaker until the mode is switched to the data transmit/receive mode. Certain time $T_5'$ is required to detect the carrier, and the voice receiver 92 is still connected to the line until the carrier is detected. The delay circuit 923 is provided to prevent the speaker 921 from reproducing the modem carrier sound. If the delay times are set such that $T_5'<T_4<T_1+T_3'$, the relay contact 922 is opened while the modem carrier is delayed by the delay circuit 923. Where the delay time relationship is set as described above and the relay contacts 924 and 922 are inserted in the input/output stage of the delay circuit 923, the reproduction of the modem carrier sound is prevented while the trailing portion of the voice signal is completely reproduced.

When the terminal 2 starts the data transmission while the terminal 1 transmits the voice, if the terminal 2 interrupts the voice receive mode, the terminal 2 outputs the end of voice signal b, or outputs data with the flag through the delay circuit 830 as the send data SD. The output of the gate 817 or the AND gate 813 for flag detection resets the RS flip-flops 819 and 828 through the OR gate 824, and after the time period $T_1$, it sets the RS flip-flop 821. The terminal 2 sends the send data SD in the data transmit/receive mode. The beginning of the send data should always be the flag.

On the other hand, the terminal 1 detects the flag from the received data RD and also detects the carrier. Thus, the RS flip-flops 819 and 828 are reset by the output of the AND gate 815, and after the time period $T_1$, the RS flip-flop 821 is set. Thus, the transmission of the modem carrier is started and the mode is switched to the data transmit/receive mode. Where both the voice and the mode signal are present and if the modem signal may produce a data error, it is necessary to insert an echo canceller.

The operations of the center and terminal data/voice transmit/receive mode selectors have been explained. The operation of the multimedia mail system is now described.

Operation of Multimedia Mail System

Figure 8B:
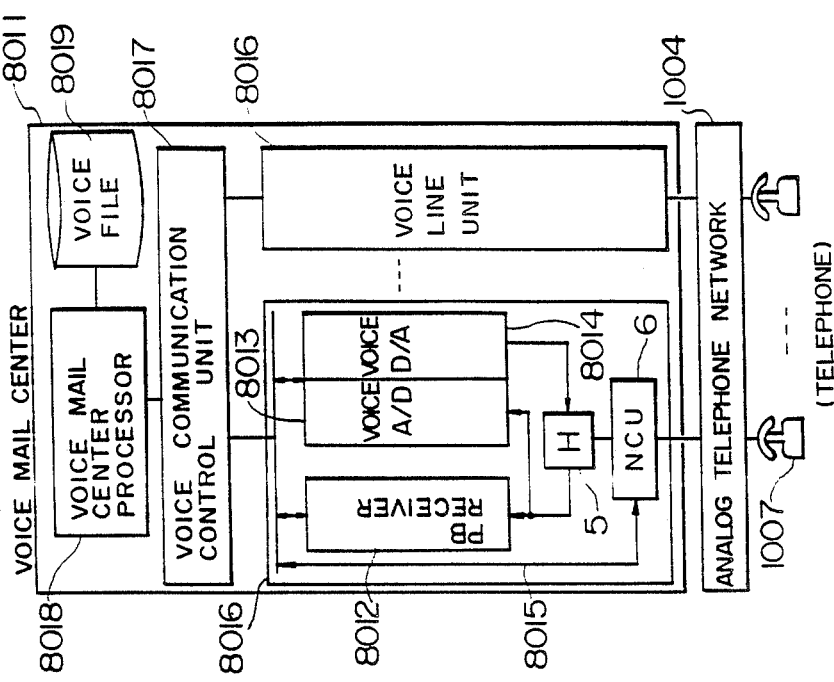
FIG. 8B shows a known voice mail system.
Figure 8A:
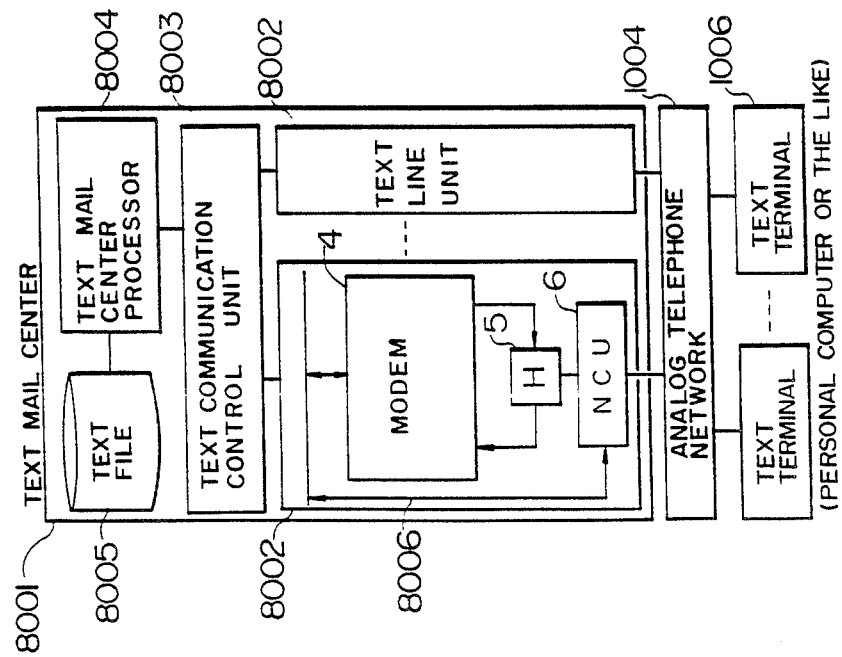
FIG. 8A shows a known text mail system.

FIGS. 8A and 8B show known text mail system and voice mail system. The text mail system of FIG. 8A comprises a text mail center 8001, an analog telephone network 1004 and a text terminal (typically a personal computer) 1006. The text mail center 8001 comprises text line unit 8002 including a modem 4, a hybrid 5 and an NCU 6 (FIG. 4A), a text communication control unit 8003, a text mail center processor 8004 and a text file 8005.

When the text terminal 1006 calls, a call signal reaches the text mail center 8001 through the analog telephone network 1004. Then, the NCU detects the reception and informs it to the text communication control unit 8003 through the control line 8006. The text communication control unit 8003 identifies which line of the text line unit the information came from assigns the line number and informs it to the text mail center processor 8004, which determines whether the reception of the call to the line is acceptable, and if it is acceptable, informs it to the NCU 6 through the text communication control unit 8003.

The NCU 6 decodes it and connects the line to the channel of the hybrid 5 - modem 6. The hybrid 5 functions to convert the two twisted paired wires of the analog telephone network 1004 to four wires of the line interface of the modulator (MOD) and demodulator (DEM) of the modem. Thus, the text terminal 1006 and the text mail processor 8004 can communicate through the text communication control unit 8003 and the modem (data modulator/demodulator) 4.

The text terminal 1006 interacts with the text center processor 8004 in accordance with a text mail protocol (for example, CCITT Recommendation X-400 series MHS protocol or T-400 series protocol) to transfer and store a desired mail to and in a text file (for example, a computer digital magnetic disk) or read the mail stored in the text file.

The voice mail system is described with reference to FIG. 8B. The voice mail system comprises a voice mail center 8011, an analog telephone network 1004 and an analog telephone set 1007.

The voice mail center 8011 comprises a voice line unit 8016 including a PB receiver 8012, a voice analog-digital converter 8013, a voice digital-analog converter 8014, a hybrid 5, an NCU 6 and a control line 8015, a voice communication control unit 8017, a voice mail center processor 8018 and a voice file 8019.

When the analog telephone set 1007 calls, a call signal reaches the voice mail center 8011 through the analog telephone network 1004. The NCU 6 then detects the reception and informs it to the voice communication control unit 8017 through the control line 8015. The voice communication control unit 8017 identifies which line of the voice line unit the information came from, assigns a line number, and informs it to the voice mail center processor 8018, which determines whether the reception of the call to the line is acceptable, and if it is acceptable, informs it to the NCU 6 through the voice communication control unit 8017.

In response to the notice, the NCU 6 connects the line to the PB receiver 8012, voice A/D 8013 and voice D/A 8014.

The PB receiver 8012 detects and decodes a push button signal of the analog telephone set 1007, converts it to a digital signal and sends it to the voice communication control unit 8017, which edits and packets the digital signal to a text message which can be interpreted by the processor 8018, and sends it to the voice mail center processor 8018. The voice mail center processor 8018 decodes the instruction of an operator of the telephone set 1007 through the text message sent through the PB receiver 8012 and the voice communication control unit 8017, reads the digital voice data stored in the voice file 8019, and sends it to the voice D/A 8014 through the voice communication control unit. The digital voice data is converted to analog voice, which is transmitted in voice to the operator through the telephone set 1007 as the next instruction from the processor 8018.

The above is repeated and the terminal operator interacts with the voice mail center processor 8018 to permit storage of the voice mail and transmission of the voice mail to the terminal operator.

The voice mail is stored in the voice file 8019 by converting the voice of the terminal operator to an analog voice signal by a handset of the telephone set 1007, sending it to the center, converting it to a digital signal by the center voice A/D 8013, editing and packetting it to the text message which is controllable by the computer, by the voice communication control unit 8017, and storing it in the voice file 8019. The voice file 8019 is usually a digital magnetic disk etc.

A configuration of the multimedia mail system is shown in FIG. 9. The multimedia mail system comprises a multimedia mail center 9001, an analog telephone network 1004 and terminals 1006, 1003', 1005 and 1007.

The configuration includes the conventional text mail system and voice mail system and a system for multimedia mail service. The prior art configuration has been explained in connection with FIG. 8. Thus, only the configuration for the multimedia service is explained here.

The multimedia terminal 9000 for the multimedia service comprises a terminal data/voice transmit/receive mode selector 1003', a text terminal 1006 and a voice transmitter/receiver 1005 or a telephone set 1007.

The multimedia text mail center 8001' comprises, in addition to the prior art text mail center configuration, a multimedia text line unit 9003 including an NCU 6, a hybrid 5, a modem 4, a selector 8 (FIG. 4A) and a control line 9002, a multimedia text communication control unit 9004 and a multimedia communication control unit 9005.

The multimedia voice mail center 8011' comprises, in addition to the prior art voice mail center configuration, a multimedia voice line unit 9013 including a multimedia voice transmitter/receiver 9' which corresponds to the voice transmitter/receiver 9 without sound source 911 and speaker/earphone 921 (FIGS. 4A and 5), a voice A/D 8013 corresponding to the earphone 921, a voice D/A 8014 corresponding to the sound source 911 and a control line 9012, a multimedia voice communication control unit 9014 and a multimedia communication control unit 9005.

The center data/voice transmit/receive mode selector 1003 comprises a selector 8 and a multimedia voice transmitter/receiver 9'.

When the multimedia terminal 9000 calls, a call signal reaches the multimedia text mail center 8001' through the analog telephone network 1004. Then, the NCU 6 detects the reception and informs it to the multimedia text communication control unit 9004 through the control line 9002. The multimedia text communication control unit 9004 identifies which line of the multimedia text line unit 9003 the notice came from, assigns a line number, and informs it to the text mail center processor 8004, which determines if the reception of the call to the line is acceptable, and if it is acceptable, informs it to the NCU 6 through the multimedia text communication control unit 9004. The NCU 6 decodes it and connects the line to the channel of hybrid 5 - modem 4 - center data/voice transmit/receive mode selector 1003.

As seen from the above description, the multimedia voice mail system does not require the NCU 6 for communicating with the terminal and controlling the cutting of the received call, the hybrid 5 and the PB receiver 8012. Thus, the multimedia mail service system is economically constructed by the combination of the voice mail system and the text mail system in addition to the center data/voice transmit/receive mode selector 1003.

The interaction control between the multimedia terminal 9000 and the multimedia center 9001 is now explained with reference to FIG. 2, which is a conceptual view of FIG. 1. In FIG. 9, the voice mail center is referred to as a multimedia voice mail center 8011', and the text mail center is referred to as a multimedia text mail center 8001'.

As the center is connected to the terminal line in the above procedure, the multimedia terminal 9000 and the text mail processor 8004 communicate with each other, check IP (password) and process charge. Then, the terminal 9000 issues a request for menu selection screen (FIG. 3A).

This procedure is explained in connection with the system operation. Since the terminal 9000 has selected the text terminal 1006, the modem carrier and the special code reach the multimedia center 9001 through the analog telephone network 1004 and they reach the selector 8 through the NCU 6, the hybrid 5 and the modem 4. The selector 8 detects the modem carrier and the special code to detect the text mode, and couples the modem 4 to the multimedia text communication control unit 9004. As explained in connection with FIGS. 4 and 5, the terminal data/voice transmit/receive mode selector controls the switches (912, 924, 922 in FIG. 5) of the voice transmitter/receiver by the selector to disconnect the voice channel. The center system operates in a different manner than FIG. 5. In the center system, when the multimedia text communication control unit 9004 is coupled to the modem, the center system detects it, prepares a text message for disconnecting the voice system, and communicates between the text mail center processor 8004 and the multimedia communication control unit 9005, and the voice mail center processor 8018 and the center processor to convey the instruction to isolate the voice transmitter/receiver. The voice mail center processor 8018 decodes it to control the switches (912, 924 and 922 in FIG. 5) of the multimedia voice transmitter/receiver 9' through the multimedia voice communication unit 9014 and the control line 9012 to disconnect the voice channel from the line.

The control line 9006 represents the other control line in FIG. 5.

Thereafter, communication is made between the multimedia terminal 9000 and the multimedia text mail center 8001' of the multimedia center 9001 in accordance with a normal text mail search protocol.

As shown in FIG. 3, the key entries for the personal mail selection and transmission/reception selection screen (FIG. 3B), the screen selection key entry and mail arrival list screen (FIG. 3C) and the sender selection screen are exchanged so that desired one of 13 mails is selected. Since the last mail is recorded in the form of voice, it is necessary to switch to the multimedia mail center 8011'.

When "2" is depressed in the text terminal in the step 2001 of FIG. 2, the text mail processor 8004 detects that the data is the voice mail, and instructs the switching to the voice channel to the multimedia text communication unit 9004. The multimedia text communication unit decodes it and issues a voice start command a (FIG. 6) to the selector 8. The selector thus controls the modem 4 to stop the sending of the modem carrier. On the other hand, the text mail center processor 8004 communicates with the voice mail processor 8018 through the multimedia communication control unit 9005 to inform the address of the voice mail and the line number and request to start voice.

The voice mail center processor 8018 requests to the multimedia voice communication control unit 9014 to start the voice transmitter/receiver 9'. The multimedia voice communication control unit 9014 commands to the voice transmitter/receiver 9' through the control line 9012 to connect the voice channel to the line in order to connect the voice channel to the line.

The voice mail center processor 8018 controls the voice file 8019 to search the desired digital voice information and sends it to the multimedia voice communication control unit 9014, which converts it to a data format for the voice D/A 8014 and outputs it. The voice D/A 8014 converts the digital voice data to analog voice and sends it to the multimedia terminal 9000 through the voice transmitter/receiver 9'.

When the voice data has been sent, the voice mail processor 8018 commands to the multimedia voice transmitter/receiver 9' through the multimedia voice communication control unit 9014 and the control line 9012 to disconnect the voice channel from the line. It also informs the end of voice to the text mail center processor 8004. The text mail center processor 8004 commands to the selector 8 through the multimedia text communication control unit to switch to the text mode. The selector 8 turns on the modem carrier and sends the special code to the multimedia terminal 9000.

Figure 10:
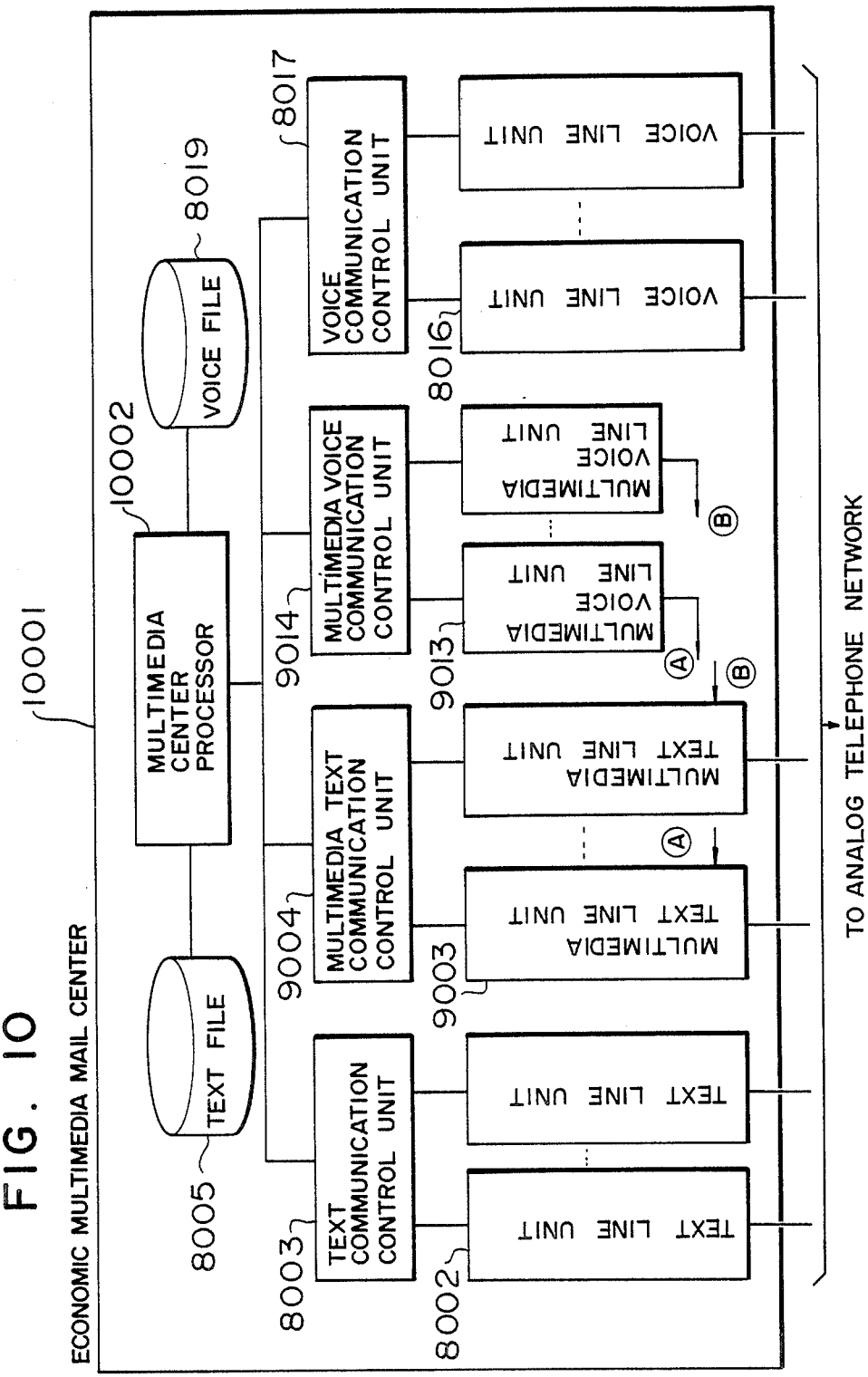
FIG. 10 shows a configuration of an economized multimedia mail center in accordance with one embodiment of the present invention.

Finally, the text mail center processor 8004 control the text file 8005 to search the end of message screen and sends it to the multimedia terminal 9000 through the multimedia text communication control unit 9004 and the multimedia text line unit 9003. Configuration of Economic Multimedia Mail Center In the above description, the multimedia text mail center 8001' and the multimedia voice mail center 8011' are independent. A more economic center may be constructed if the multimedia mail centers are constructed from the beginning. FIG. 10 shows an economic multimedia mail center. As is apparent from the comparison with FIG. 9, the text mail center processor 8004, the multimedia communication control unit 9005 and the voice mail center processor 8018 are combined into a single multimedia center processor 10001.

In the present system, since the multimedia text mail center and the multimedia voice mail center are consolidated, the selector having the same function as that of the terminal data/voice selector may be used as the center data/voice selector.

As described above, the multimedia mail system can be readily constructed with conventional voice mail/text mail terminals by adding the data/voice transmit/receive mode selector and the interprocessor communication line. With the present system, the voice message can be registered in the form of voice without editing it to a text through a telephone set everywhere in the country. Thus, even a children or aged persons can readily register a message. The message can be very readily selected and the final message selection can be readily searched by a list screen with communication with the center. Further, various services which could not be offered with only the voice can be selected by one center number. The existing terminals can be used as they are. Only the voice transmitter/receiver and the selector need be added to the conventional terminal, no modification of the text terminal is required.

I claim:

1. A multimedia mail system for transferring and storing test data and voice data within said multimedia mail system, comprising:
    a telephone network;
    a text mail center storing test data;
    a voice mail center storing voice data;
    a center text/voice transmit/receive selector connected to said text mail center, said voice mail center and said telephone network, said center selector transferring test data between said text mail center and said telephone network, and said center selector further transferring voice data between said voice mail center and said telephone network, said center selector switching between transferring the text data, or the voice data or the text and voice data during one call;
    a text terminal for inputting and outputting text data;
    a voice terminal for inputting and outputting voice data; and
    a terminal text/voice transmit/receive selector connected to said text terminal, said voice terminal and said telephone network, said terminal selector transferring text data between said text terminal and said telephone network, said terminal selector further transferring voice data between said voice terminal and said telephone network, said terminal selector switching between transferring the next data or the voice data or the text and voice data during one call.

2. A multimedia mail system according to claim 1 wherein, said center text/voice transmit/receive selector comprises: first means for generating a first discrimination signal to be transferred with either the text data or the voice data to identify a type of data, voice or text, to be transferred by said center selector; and said terminal text/voice transmit/receive selector comprises a second means for generating a second discrimination signal transferred with either the text data or the voice data to identify the type of data, voice or text, to be transferred by said terminal selector,
    where said center text/voice transmit/receive selector and said terminal text/voice transmit/receive selector switch between transferring the text data and the voice data in accordance with the type of data identified by said first discrimination signal or second discrimination signal.

3. A multimedia mail system according to claim 1 wherein said voice mail center comprises a voice mail center processor for controlling a transfer of the voice data and said text mail center comprises a text mail center processor for controlling a transfer of the text data and wherein said voice mail center processor and said text mail center processor are interconnected processors for a transfer of stored text data and stored voice data between said centers.

4. A multimedia mail system for transferring and storing test data and voice data within said system comprising:
    a telephone network;
    a multimedia mail center connected to said network receiving voice and text data from said network and transferring voice and text data to said network; and a plurality of terminals connected to said network;

said multimedia mail center comprising;
  first means for storing the text data;
  second means for storing the voice data;
  a first text/voice transmit/receive selector transferring the text data between said first means and said telephone network and for transferring the voice data between said telephone network and said second means, said first selector switching between transferring the next data or the voice data or both text and voice data during one call; and
  third means for controlling said first means, said second means and said first text/voice transmit/receive selector; and at least one of said terminals having;
  fourth means for inputting and outputting the text data;
  fifth means for inputting and outputting the voice data; and
  a second text/voice transmit/receive selector transferring the text data and the voice data by switching between the text data or the voice data or the voice and text data during one call;

where said multimedia mail center stores the text data and the voice data received from the at least one terminal via said network in said first means and said second means respectively by said first selector switching between the text data and the voice data during one call under control of said third means, and said multimedia mail center transmitting the text data and the voice data stored in said first means and said second means respectively to the terminal by said first selector switching between the text data and the voice data during one call under control of said third means, and said second selector of said terminal transfers data between said multimedia mail center, said fourth means and said fifth means by switching between the text data and the voice data during one call.

5. A multimedia mail system according to claim 4;
  where said first text/voice selector comprises:
    means for transferring voice data to and from said second means;
    means for transferring text data to and from said first means by modulating or demodulating a first selector carrier signal;
    means for generating a first discrimination signal transferred with the text data or the voice data, said first discrimination signal discriminating between the text data and the voice data; and
    means for switching between transferring the text data and the voice data to and from said second text/voice selector in response to said first discrimination signal and also in response to a second discrimination signal received from said second text/voice selector; and
  said second text/voice selector comprises:
    means for transferring voice data to and from said fifth means;
    means for transferring text data to and from said fourth means by modulating or demodulating a second selector carrier signal;
    means for generating said second discrimination signal transferred with the text data or the voice data, said second discrimination signal discriminating between the text data and the voice data; and
    means for switching between transferring the text data and the voice data to and from said first text/voice selector in accordance with said second discrimination signal to be transmitted to said first text/voice signal selector and in accordance with said first discrimination signal received from said first text/voice selector.

6. A multimedia mail system according to claim 5 wherein said first text/voice selector comprises a first modem generating a first carrier signal for use as said first discrimination signal and as said first selector carrier signal for modulating and demodulating the text data, and wherein said second selector comprises a second modem generating a second carrier signal for use as said second discrimination signal and as said second selector carrier.

7. A multimedia mail system according to claim 6, further including, in both said first and second selectors, means for generating special data, in addition to said first and second discrimination signals respectively for discriminating between test data and voice data.

8. A multimedia mail system according to claim 7, wherein said special data is a flag in a flag synchronization system.

9. A multimedia mail system according to claim 7, wherein said special data is a STX (indicating start of text) in a stepping synchronization system.

10. A multimedia mail system according to claim 7, wherein said special data is a SYN (synchronization bit) in a SYN synchronization system.

11. A multimedia mail center connected to a plurality of terminals transmitting and receiving text data and voice data through a telephone network, comprising:
  first means for storing the text data;
  second means for storing the voice data;
  a text/voice transmit/receive selector connected to said first and said second means for switching between transferring the text data or the voice data or the text and voice data during one call; and
  means for controlling said first means, said second means and said text/voice transmit/receive selector;
  where said multimedia mail center stores the text data and the voice data received from one of said plurality of terminals in said first means and said second means respectively by said selector switching between the text data and the voice data during one call under control of said means for controlling, and said multimedia mail center transmits the text data and the voice data stored in said first means and said second means respectively to a second one of said plurality of terminals by said selector switching between the text data and voice data during one call under control of said means for controlling.

12. A multimedia center according to claim 11, wherein said text/voice transmit/receive selector comprises:
  third means for transmitting and receiving the voice data to and from said second means;
  fourth means for transmitting and receiving the text data to and from said first means by modulating or demodulating a carrier signal;
  means for generating a first discrimination signal transmitted with the text data or the voice data, said discrimination signal discriminating between the text data and the voice data; and means for switching between said third means and said fourth means in response to said discriminating signal from said means for generating a discriminating signal transmitted with the stored data to the second terminal and also in response to a second discrimination signal generated in one of the plurality of terminals, said second discrimination signal discriminating between the text data and the voice data in data transmitted by said terminal.

13. A multimedia mail enter according to claim 12, wherein said means for generating a discrimination signal comprises a modem generating a first carrie signal used as said first discrimination signal, said first carrier signal also being used as said carrier signal.

14. A multimedia mail center according to claim 13, further including means for generating special data in addition to said first and second discrimination signals respectively for discriminating between the text data and the voice data.

15. A multimedia mail center according to claim 14, wherein said special data is a flag in a flag synchronization system.

16. A multimedia mail center according to claim 14, wherein said special data is a STX (indicating start of text) in a stepping synchronization system.

17. A multimedia mail center according to claim 14, wherein said special data is a SYN (synchronization bit) in a SYN synchronization system.

18. A multimedia mail center according to claim 11, wherein said first means is a text file and said second means is a voice file and said text/voice transmit/receive selector is a center text/voice transmit/receive selector, said text file and said voice file being connected to the telephone network through said center text/voice transmit/receive selector.

19. A multimedia mail center according to claim 11, wherein said first means is a text file and said second means is a voice file and said means for controlling is a multimedia center processor, said voice file and said text file being connected to said multimedia center processor which is connected to the telephone network through said text/voice transmit/selector.

* * * * *

UNITED STATES PATENT AND TRADEMARK OFFICE
CERTIFICATE OF CORRECTION

PATENT NO. : 4,972,462

DATED : November 20, 1990

INVENTOR(S) : Yoji Shibata

Page 1 of 2

It is certified that error appears in the above-identified patent and that said Letters Patent is hereby corrected as shown below:

| Column | Line | |
|---|---|---|
| 1 | 66 | After "selector" insert --of--. |
| 2 | 40 | After "through" insert --a--. |
| 3 | 10 | After "informs" delete "to". |
| 3 | 62 | Before "flip-flops" delete "for". |
| 4 | 5 | Before "beginning" insert --the--. |
| 4 | 12 | Before "beginning" insert --the--. |
| 4 | 15 | Before "beginning" insert --the--. |
| 4 | 23 | Before "beginning" insert --the--. |
| 5 | 1 | Change "the. RS" to --the RS--. |
| 5 | 16 | Before "beginning" insert --the--. |
| 6 | 9 | After "from" insert --,--. |
| 8 | 65 | Change "2  " to --2 #--. |
| 8 | 68 | Before "the voice" change "to" to --of--. |
| 9 | 36 | Change "control" to --controls--. |
| 9 | 40 | After "9003." start a new paragraph. |
| 9 | 64 | Before "children" delete "a". |
| 10 | 34 | Change "next" to --text--. |
| 10 | 64 | Change "test data" to --text data--. |

UNITED STATES PATENT AND TRADEMARK OFFICE
CERTIFICATE OF CORRECTION

PATENT NO. : 4,972,462

DATED : November 20, 1990

INVENTOR(S) : Yoji Shibata

It is certified that error appears in the above-identified patent and that said Letters Patent is hereby corrected as shown below:

| Column | Line | |
|---|---|---|
| 11 | 12 | Change "next" to --text--. |
| 12 | 23 | Change "test data" to --text data--. |
| 13 | 12 | Change "mail enter" to --mail center--. |
| 13 | 14 | Change "carrie" to --carrier--. |

Signed and Sealed this

Nineteenth Day of May, 1992

Attest:

DOUGLAS B. COMER

Attesting Officer

Acting Commissioner of Patents and Trademarks